US009762430B2

(12) United States Patent
Hong et al.

(10) Patent No.: US 9,762,430 B2
(45) Date of Patent: Sep. 12, 2017

(54) METHOD AND APPARATUS FOR CLEARING CONFIGURATION COMMAND IN COMMUNICATION EQUIPMENT

(71) Applicant: Huawei Technologies Co., Ltd., Shenzhen (CN)

(72) Inventors: Weijiang Hong, Beijing (CN); Xifeng Zhou, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 480 days.

(21) Appl. No.: 14/460,815

(22) Filed: Aug. 15, 2014

(65) Prior Publication Data
US 2014/0359087 A1 Dec. 4, 2014

Related U.S. Application Data

(63) Continuation of application No. PCT/CN2012/071281, filed on Feb. 17, 2012.

(51) Int. Cl.
G06F 15/16 (2006.01)
H04L 12/24 (2006.01)

(52) U.S. Cl.
CPC ............ H04L 41/044 (2013.01); H04L 41/08 (2013.01); H04L 41/0803 (2013.01)

(58) Field of Classification Search
CPC .... H04L 41/044; H04L 41/0803; H04L 41/08
See application file for complete search history.

(56) References Cited

U.S. PATENT DOCUMENTS 5,996,009 A * 11/1999 Kitamura ............ H04L 41/0803
707/999.01
7,065,764 B1 6/2006 Prael et al.
(Continued)

FOREIGN PATENT DOCUMENTS

CN 1336770 A 2/2002
CN 1684430 A 10/2005
(Continued)

OTHER PUBLICATIONS

Cohen et al. "The Combinatorial Design Approach to Automatic Test Generation". 1996 International Symposium on software Reliability Engineering, White Plains NY. Nov. 2, 1996. pp. 83-88.*
(Continued)

Primary Examiner — John MacIlwinen
(74) Attorney, Agent, or Firm — Slater Matsil, LLP

(57) ABSTRACT

A method and an apparatus can be used for clearing a configuration command in communication equipment effectively and rapidly. Hierarchy information of each network element and information of a configuration command deployed on each network element in communication equipment are acquired. The hierarchy information is determined as hierarchy information of the configuration command deployed on each network element. A configuration command tree is constructed in an initial status according to hierarchy information of configuration commands deployed on all network elements. A target status of the configuration command tree is obtained according to a specific configuration status that is specified by a user and the communication equipment needs to recover to. The initial status and the target status of the configuration command tree are compared and a node that needs to be cleared from the configuration command tree is determined.

14 Claims, 3 Drawing Sheets

(56) References Cited

U.S. PATENT DOCUMENTS

| | | | | |
|---|---|---|---|---|
| 7,307,979 | B2* | 12/2007 | Visser | H04L 45/00 370/351 |
| 7,814,126 | B2* | 10/2010 | Prabu | G06F 8/61 707/804 |
| 2002/0010908 | A1* | 1/2002 | Cheng | G06F 8/34 717/106 |
| 2002/0184252 | A1 | 12/2002 | Holtz et al. | |
| 2003/0051049 | A1* | 3/2003 | Noy | H04L 41/08 709/238 |
| 2005/0234931 | A1* | 10/2005 | Yip | H04L 41/0816 |
| 2006/0015591 | A1* | 1/2006 | Datla | G06F 8/33 709/220 |
| 2007/0169008 | A1* | 7/2007 | Varanasi | H04L 41/08 717/136 |
| 2010/0030883 | A1* | 2/2010 | Kiefer | H04L 12/24 709/223 |

FOREIGN PATENT DOCUMENTS

| | | |
|---|---|---|
| CN | 1786903 A | 6/2006 |
| CN | 1909693 A | 2/2007 |
| CN | 101035131 A | 9/2007 |
| CN | 101110703 A | 1/2008 |
| CN | 101222359 A | 7/2008 |
| CN | 101257402 A | 9/2008 |
| CN | 101546264 A | 9/2009 |
| CN | 1015746264 A | 9/2009 |
| EP | 0682429 A2 | 11/1995 |
| JP | 2005222465 A | 8/2005 |

OTHER PUBLICATIONS

IBM Corporation, "IBM LoadLeveler for AIX—Using and Administering," Version 2, Release 1, Oct. 1, 1998, 12 pages.

Park, Jun Ho, et al., "CORBA-Based Distributed and Replicated Resource Repository Architecture for Hierarchically Configurable Home Network," Journal of Systems Architecture, vol. 51, No. 2, Feb. 1, 2005, pp. 125-142.

Open Mobile Alliance, "OMA Device Management Tree and Description," Draft Version 1.2.1, May 22, 2008, 48 pages.

* cited by examiner

METHOD AND APPARATUS FOR CLEARING CONFIGURATION COMMAND IN COMMUNICATION EQUIPMENT

This application is a continuation of International Application No. PCT/CN2012/071281, filed on Feb. 17, 2012, which is hereby incorporated by reference in its entirety.

TECHNICAL FIELD

The present invention relates to the field of electronic technologies and, in particular embodiments, to a method and an apparatus for clearing a configuration command in a communication equipment.

BACKGROUND

When there are many configuration commands in a communication equipment, the configuration commands need to be cleared.

A method for clearing a configuration command in the prior art includes restarting the communication equipment when configuration commands in a communication equipment reach a certain number, so as to clear all the configuration commands in the communication equipment.

The foregoing method for clearing a configuration command in the prior art has the following shortcomings. The communication equipment needs to be restarted, and the configuration commands in the communication equipment cannot be cleared partially, but can only be cleared completely.

SUMMARY

Embodiments of the present invention provide a method and an apparatus for clearing a configuration command in a communication equipment, so as to clear the configuration command in the communication equipment effectively.

A method for clearing a configuration command in a communication equipment is provided. Hierarchy information of each network element and information of a configuration command deployed on each network element in a communication equipment is acquired. The hierarchy information of each network element is determined as hierarchy information of the configuration command deployed on each network element. A configuration command tree is constructed in an initial status according to hierarchy information of configuration commands deployed on all network elements. Each node in the configuration command tree represents one configuration command. A target status of the configuration command tree is obtained according to a specific configuration status that is specified by a user and the communication equipment needs to recover to. The initial status and the target status of the configuration command tree are compared. A node that needs to be cleared from the configuration command tree is determined according to a comparison result. The node that needs to be cleared is cleared according to a default clearing rule of the communication equipment and/or a customized clearing rule.

An apparatus can be used for clearing a configuration command in a communication equipment. A configuration command tree constructing module is configured to acquire hierarchy information of each network element and information of a configuration command deployed on each network element in a communication equipment, determine the hierarchy information of each network element as hierarchy information of the configuration command deployed on each network element, and to construct a configuration command tree in an initial status according to hierarchy information of configuration commands deployed on all network elements. Each node in the configuration command tree represents one configuration command. A configuration command clearing processing module is configured to obtain a target status of the configuration command tree according to a specific configuration status that is specified by a user and the communication equipment needs to recover to, to compare the initial status and the target status of the configuration command tree, to determine a node that needs to be cleared from the configuration command tree according to a comparison result, and to clear the node that needs to be cleared according to a default clearing rule of the communication equipment and/or a customized clearing rule.

It can be seen from the technical solutions provided by the foregoing embodiments of the present invention that, in the embodiments of the present invention, the configuration command in the communication equipment may be cleared effectively and rapidly by constructing the configuration command tree and clearing, according to the default clearing rule of the communication equipment and/or the customized clearing rule, the node that needs to be cleared.

DETAILED DESCRIPTION OF ILLUSTRATIVE EMBODIMENTS

The following describes the embodiments of the present invention in detail with reference to the accompanying drawings.

Embodiment 1

Figure 1:
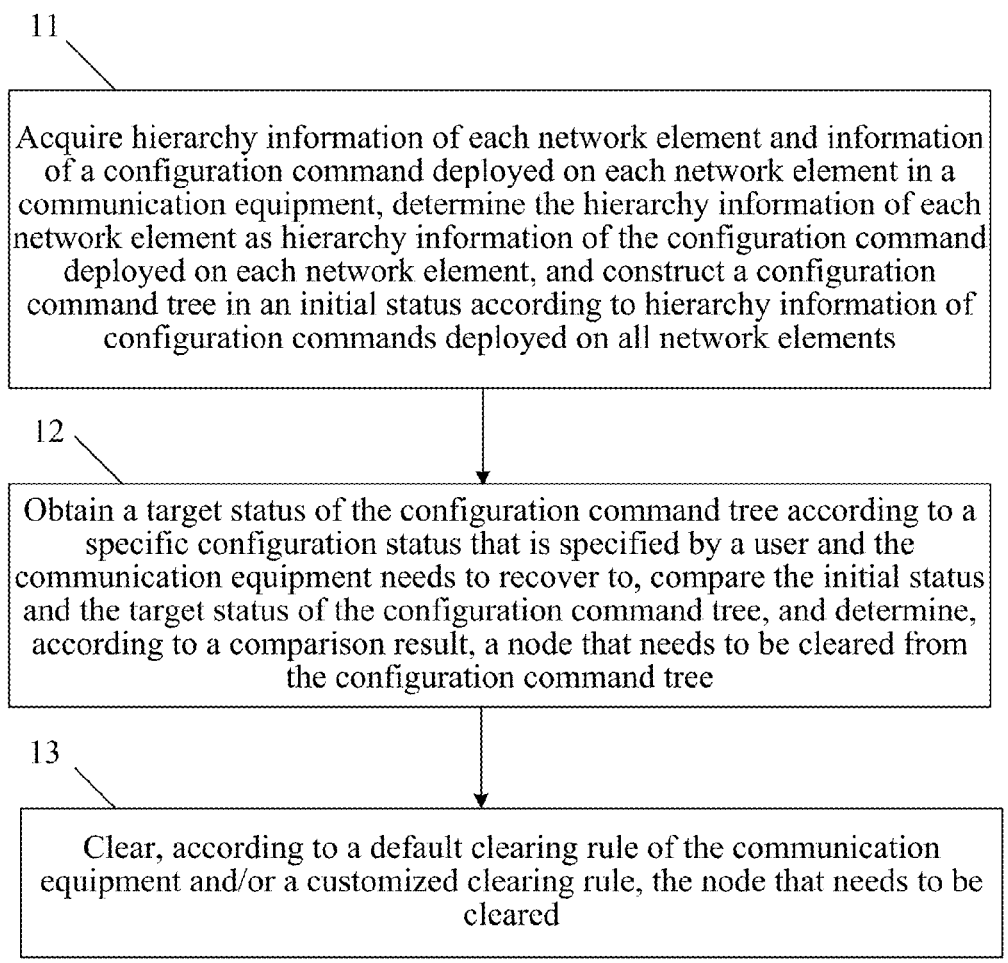
FIG. 1 is a specific processing flow chart of a method for clearing a configuration command in a communication equipment according to Embodiment 1 of the present invention.

This embodiment provides a method for clearing a configuration command in a communication equipment. As shown in FIG. 1, a specific processing procedure includes the following processing steps.

Step 11: Acquire hierarchy information of each network element and information of a configuration command deployed on each network element in a communication equipment, determine the hierarchy information of each network element as hierarchy information of the configuration command deployed on each network element, and construct a configuration command tree in an initial status according to hierarchy information of configuration commands deployed on all network elements.

A command is delivered to each network element in the communication equipment, to command each network element to return configuration information of the network element, such as a hierarchy, and the information of the configuration command deployed on each network element.

A hierarchical relationship of each network element represents a hierarchical relationship of the configuration command deployed on each network element. According to the information returned by each network element, the hierarchy information of each network element is determined as the hierarchy information of the configuration command deployed on each network element. That is, a configuration command deployed on a network element at a first level is taken as a branch (branch node), and a configuration command deployed on a network element at a second level below the network element at the first level is taken as a Branch or Leaf (leaf node). A Branch may include a Branch below (repeated nesting is allowed), and may also include a Leaf; but a Leaf cannot include a Branch below, that is, a Leaf is a node at a lowest level.

A unique treeroot (root node) is set, and is a 'root' node of configuration nodes of all levels in a configuration tree by default. A configuration command tree including a unique TreeNode is constructed according to the treeroot and all branches and Leaves, where each node in the configuration command tree represents one configuration command.

Figure 2:
FIG. 2 is a schematic diagram of setting a configuration command to a branch or a Leaf by using a system command according to Embodiment 1 of the present invention.

This embodiment provides a schematic diagram of converting the configuration command deployed on each network element into the configuration command tree, as shown in FIG. 2. In FIG. 2, different indent types are used to indicate a treeroot, a branch and a Leaf; if a certain node still has a node at a next level, the node is a Branch; if a certain node does not have a node at a next level, the node is a Leaf.

Step 12: Obtain a target status of the configuration command tree according to a specific configuration status that is specified by a user and the communication equipment needs to recover to, compare the initial status and the target status of the configuration command tree, and determine, according to a comparison result, a node that needs to be cleared from the configuration command tree.

The constructed configuration command tree is the configuration command tree in the initial status; the target status of the configuration command tree is a status of the configuration command tree after the node is cleared. The target status of the configuration command tree is obtained according to the specific configuration status that is specified by the user and the communication equipment needs to recover to, where the target status may be an empty tree status, a tree status that several branches are kept, and so on. Then, a corresponding tree shape format of the configuration command tree may be constructed manually or by using an external program according to the target status of the configuration command tree, and is stored in a specified storage space, and then read by a system.

The node that needs to be cleared from the configuration command tree may be determined according to the initial status and the target status of the configuration command tree. The initial status and the target status of the configuration command tree are compared, and information of nodes (branch, leaf) that need to be kept and need to be cleared in the configuration command tree is determined according to the comparison result.

Step 13: Clear, according to a default clearing rule of the communication equipment and/or a customized clearing rule, the node that needs to be cleared.

The node that needs to be cleared is cleared according to the default clearing rule of the communication equipment and/or the customized clearing rule.

One configuration command may include multiple parameters, and for example, one configuration command may be expressed as: Cmd $1 {$2|$3 $4} [$5]; in the configuration command, a parameter $1 is mandatory; | indicates that one is chosen between a parameter $2 and a parameter $3 $4; and [ ] indicates that a parameter $5 is optional.

The default clearing rule of the communication equipment is undo cmd, that is, a command line of the default clearing rule is constructed by adding undo (uninstall) before any configuration command, and the configuration command is cleared by running the command line of the default clearing rule.

A command line of the customized clearing rule is constructed according to information of all or part of parameters included in the configuration command and the command line of the default clearing rule, and the configuration command is cleared by running the command line of the customized clearing rule.

For example, the customized clearing rule includes, but is not limited to, the following several forms.

1. For a configuration command including multiple mandatory parameters, the command line of the customized clearing rule is constructed by taking one of the parameters as a variable parameter and by the command line of the default clearing rule. For example, for a configuration command including three mandatory parameters, cmd $1 $2 $3, if a customized clearing rule is undo cmd [var=>$2] [$3], a clearing command line is constructed by taking $2 from the command as the variable parameter.

2. Some configuration commands are in a form of enable cmd, that is, cannot be cleared with undo, and disable needs to be added for clearing this part of configuration commands, so a customized clearing rule is disable cmd.

3. The command line of the customized clearing rule is constructed by reducing the parameters of the configuration command in order from back to front by default and by the command line of the default clearing rule. For example, for a configuration command including four mandatory parameters cmd $1 $2 $3 $4, a constructed customized clearing rule is undo cmd $1 $2 $3, undo cmd $1 $2 and undo cmd $1 in sequence. That is, undo cmd $1 $2 $3 is used first to clear the configuration command. If the clearing is unsuccessful, undo cmd $1 $2 is used to clear the configuration command. If the clearing is still unsuccessful, undo cmd $1 is used to clear the configuration command.

4. All parameters included in the configuration command are decomposed into each independent parameter when the parameters included in the configuration command are less than a set value, for example, <=4, and the command line of the customized clearing rule is constructed according to all permutations and combinations of all independent parameters and the command line of the default clearing rule.

For example, for cmd $1 $2 $3, a customized clearing rule may be undo cmd $1 $2, undo cmd $1 $3, undo cmd $2 $3, undo cmd $1, undo cmd $3, undo cmd $2. The configuration command is cleared by traversing the foregoing various customized clearing rules in sequence.

It can be seen from the technical solution provided by the foregoing embodiment of the present invention that, in the embodiment of the present invention, the configuration command in the communication equipment may be cleared effectively and rapidly by constructing the configuration command tree and clearing, according to the default clearing rule of the communication equipment and/or the customized clearing rule, the node that needs to be cleared.

Embodiment 2

Figure 3:
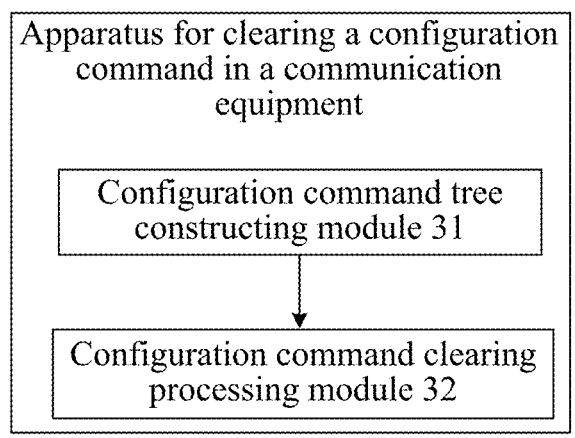
FIG. 3 is a specific structural diagram of an apparatus for clearing a configuration command in a communication equipment according to Embodiment 2 of the present invention.

This embodiment provides an apparatus for clearing a configuration command in a communication equipment; as shown in FIG. 3, a specific structure includes the following modules.

A configuration command tree constructing module 31 is configured to acquire hierarchy information of each network element and information of a configuration command deployed on each network element in a communication equipment, determine the hierarchy information of each network element as hierarchy information of the configuration command deployed on each network element, and construct a configuration command tree in an initial status according to hierarchy information of configuration commands deployed on all network elements, where each node in the configuration command tree represents one configuration command.

A configuration command clearing processing module 32 is configured to obtain a target status of the configuration command tree according to a specific configuration status that is specified by a user and the communication equipment needs to recover to, compare the initial status and the target status of the configuration command tree, determine, according to a comparison result, a node that needs to be cleared from the configuration command tree, and clear, according to a default clearing rule of the communication equipment and/or a customized clearing rule, the node that needs to be cleared.

Specifically, the configuration command tree constructing module 31 is further configured to deliver a command to each network element in the communication equipment, to command each network element to return the hierarchy information of the network element and the information of the configuration command deployed on each network element, and to determine, according to the information returned by each network element, the hierarchy information of each network element as the hierarchy information of the configuration command deployed on each network element, take a configuration command deployed on a network element at a first level as a branch node branch, take a configuration command deployed on a network element at a second level below the network element at the first level as a Branch or leaf node Leaf, where the Leaf is a node at a lowest level, select a unique root node treeroot, and construct the configuration command tree in the initial status according to the treeroot and all branches and Leaves.

Specifically, the configuration command clearing processing module 32 is further configured to construct a command line of the default clearing rule by adding undo uninstall before the configuration command, and clear the configuration command by running the command line; and to construct the command line of the customized clearing rule according to information of all or part of parameters included in the configuration command and the command line of the default clearing rule, and clear the configuration command by running the command line of the customized clearing rule.

Specifically, for a configuration command including multiple mandatory parameters, the command line of the customized clearing rule is constructed by taking one of the parameters as a variable parameter and by the command line of the default clearing rule, or the command line of the customized clearing rule is constructed by reducing the parameters of the configuration command in order from back to front by default and by the command line of the default clearing rule, or all parameters included in the configuration command are decomposed into each independent parameter when the parameters included in the configuration command are less than a set value, and the command line of the customized clearing rule is constructed according to all permutations and combinations of all independent parameters and the command line of the default clearing rule.

Further, the configuration command clearing processing module 32 is further configured to, when a first node that needs to be cleared is dependent on a second node, clear the second node first and then clear the first node.

A specific process of applying the apparatus in the embodiment of the present invention to clear the configuration command in the communication equipment is similar to that of the foregoing method embodiment, and is not repeatedly described here.

Persons of ordinary skill in the art should understand that all or part of the procedures of the methods in the foregoing embodiments may be implemented by a computer program instructing relevant hardware. The program may be stored in a computer readable storage medium. When the program is run, the procedures of the methods in the foregoing embodiments are performed. The storage medium may be a magnetic disk, an optical disk, a read-only memory (Read-Only Memory, ROM), or a random access memory (Random Access Memory, RAM), and so on.

In conclusion, in the embodiments of the present invention, by constructing the configuration command tree and clearing, according to the default clearing rule of the communication equipment and/or the customized clearing rule, the node that needs to be cleared, the configuration command in the communication equipment may be cleared effectively and rapidly, and the communication equipment may be enabled to recover to a specific configuration status without restarting the communication equipment.

The method and component apparatus of the embodiments of the present invention may be integrated into all products adopting the VRP platform of Huawei, and may be applied to automated verification processes of various products to clear a residual configuration of a communication equipment rapidly, so that the equipment is in an "empty" configuration status.

The foregoing description is merely specific exemplary implementation manners of the present invention, but not intended to limit the protection scope of the present invention. Any variation or replacement that may be easily made by persons skilled in the art within the technical scope disclosed in the present invention shall fall within the protection scope of the present invention. Therefore, the protection scope of the present invention shall be subject to the appended claims.

What is claimed is:

1. A method for clearing configuration commands in a communication equipment, the method comprising:
   acquiring hierarchy information of each network element in the communication equipment and information of a configuration command deployed on each network element in the communication equipment, the hierarchy information of each network element representing a hierarchical position of a corresponding network element among network elements of the communication equipment;
   associating the hierarchy information of each network element with a configuration command deployed on a corresponding network element;
   constructing a first configuration command tree using configuration commands deployed on the network elements of the communication equipment according to hierarchy information that are associated with the configuration commands, wherein the first configuration command tree represents an initial status of the configuration commands, and each node in the first configuration command tree represents one configuration command deployed on a corresponding network element;

obtaining a target status of the first configuration command tree, the target status of the first configuration command tree corresponding to a second configuration command tree, wherein each node in the second configuration command tree represents a configuration command deployed on a corresponding network element, wherein the target status is obtained according to a specific configuration status that is specified by a user;

comparing the first configuration command tree with the second configuration command tree, thereby generating a comparison result that indicates whether or not a first node present in the first configuration command tree is absent in the second configuration command tree;

and clearing, according to a clearing rule of the communication equipment, a configuration command that is represented by the first node in the first configuration command tree when the comparison result indicates that the first node present in the first configuration command tree is absent in the second configuration command tree.

2. The method according to claim 1, wherein the acquiring comprises sending a command to each network element in the communication equipment, to command each network element to return hierarchy information of a corresponding network element and the information of the configuration command deployed on the corresponding network element.

3. The method according to claim 2, wherein associating the hierarchy information of each network element with the configuration command deployed on the corresponding network element comprises associating the hierarchy information of each network element with the configuration command deployed on the corresponding network element according to information returned by the corresponding network element.

4. The method according to claim 3, wherein the first configuration command tree comprises:
a root node, the root node being a node in the first configuration command tree without having a parent node;
one or more branch nodes, each of the branch nodes having a parent node and a child node; or
one or more leaf nodes, each of the leaf nodes having a parent node without having a child node; and
wherein a relationship between a parent node and a child node of the parent node is determined according to hierarchy information associated with the parent node and hierarchy information associated with the child node.

5. The method according to claim 1, wherein clearing the configuration command is performed by running a command line of a default clearing rule, the command line of the default clearing rule being constructed by adding an "undo" command before the configuration command, wherein the command line undoes the configuration command.

6. The method according to claim 1, wherein clearing the configuration command is performed by running a command line of a customized clearing rule, the command line of the customized clearing rule being constructed using at least one parameter in the configuration command and a default clearing rule of the communication equipment.

7. The method according to claim 6, wherein the configuration command comprises multiple mandatory parameters and the at least one parameter is selected from the multiple mandatory parameters.

8. The method according to claim 6, wherein clearing the configuration command comprises:
constructing a first command line using a first number of mandatory parameters in the configuration command;
constructing a second command line using a second number of mandatory parameters in the configuration command, the second number of mandatory parameters comprising less mandatory parameters than the first number of mandatory parameters; and
clearing the configuration command using the second command line when clearing the configuration command using the first command line fails.

9. The method according to claim 6, wherein clearing the configuration command comprises:
constructing a set of command lines, each of the set of command lines being constructed using a different combination and permutation of one or more parameters of the configuration command; and
clearing the configuration command by running one of the set of command lines.

10. The method according to claim 1, wherein clearing the configuration command comprise, when the first node is dependent on a second node in the first configuration command tree, clearing a configuration command that is represented by the second node before clearing the configuration command represented by the first node.

11. An apparatus for clearing configuration commands in a communication equipment, the apparatus comprising:
a memory storage comprising instructions; and
one or more processors in communication with the memory storage, wherein the one or more processors execute the instructions to:
acquire hierarchy information of each network element in the communication equipment and information of a configuration command deployed on each network element in the communication equipment, the hierarchy information of each network element representing a hierarchical position of a corresponding network element among network elements of the communication equipment;
associate the hierarchy information of each network element with a configuration command deployed on a corresponding network element;
construct a first configuration command tree using configuration commands deployed on the network elements of the communication equipment according to hierarchy information that are associated with the configuration commands, wherein the first configuration command tree represents an initial status of the configuration commands, and each node in the first configuration command tree represents one configuration command deployed on a corresponding network element;
obtain a target status of the first configuration command tree, the target status corresponding to a second configuration command tree, wherein each node in the second configuration command tree represents a configuration command deployed on a corresponding network element, wherein the target status is obtained according to a specific configuration status that is specified by a user;
compare the first configuration command tree with the second configuration command tree, wherein comparing the first configuration command tree with the second configuration command tree indicates whether or not a first node that is present in the first configuration command tree is absent in the second configuration command tree;

and clear, according to a clearing rule of the communication equipment, a configuration command that is represented by the first node in the first configuration command tree when the comparing indicates that the first node present in the first configuration command tree is absent in the second configuration command tree.

12. The apparatus according to claim 11, wherein the instructions comprise further instructions to:

deliver a command to each network element in the communication equipment, to command each network element to return hierarchy information of a corresponding network element and the information of the configuration command deployed on the corresponding network element; and associate, according to information returned by each network element, hierarchy information of a corresponding network element with a configuration command deployed on the corresponding network element; and wherein the first configuration command tree comprises:
a root node, the root node being a node in the first configuration command tree without having a parent node;
one or more branch nodes, each of the branch nodes having a parent node and a child node; or
one or more leaf nodes, each of the leaf nodes having a parent node without having a child node; and
wherein a relationship between a parent node and a child node of the parent node is determined according to hierarchy information associated with the parent node and hierarchy information associated with the child node.

13. The apparatus according to claim 11, wherein the configuration command is cleared by running a command line, and wherein:

the command line is constructed according to a default clearing rule by adding an "undo" command before the configuration command, wherein the command line undoes the configuration command; or the command line is constructed according to a customized clearing rule using at least one parameter in the configuration command and a default clearing rule.

14. The apparatus according to claim 11, wherein, when the first node is dependent on a second node, a configuration command that is represented by the second node is cleared before the configuration command that is represented by the first node.

* * * * *